United States Patent [19]

Udagawa

[11] Patent Number: 4,767,124

[45] Date of Patent: Aug. 30, 1988

[54] GASKET FOR AN INTERNAL COMBUSTION ENGINE

[75] Inventor: Tsunekazu Udagawa, Ichikawa, Japan

[73] Assignee: Ishikawa Gasket Co., Ltd., Tokyo, Japan

[21] Appl. No.: 121,440

[22] Filed: Nov. 17, 1987

Related U.S. Application Data

[63] Continuation-in-part of Ser. No. 936,866, Dec. 2, 1986, Pat. No. 4,711,456.

[30] Foreign Application Priority Data

Jul. 29, 1986 [JP] Japan ................................ 61-116114

[51] Int. Cl.[4] ................................................ F16J 15/12

[52] U.S. Cl. ................................ 277/235 B; 277/234; 277/236

[58] Field of Search ........... 277/166, 233, 234, 235 R, 277/235 A, 235 B, 236

[56] References Cited

U.S. PATENT DOCUMENTS 1,472,133 10/1923 Oven ........................... 277/235 B X
1,847,729 3/1932 Shaw ........................... 277/235 B X
4,330,585 5/1982 Eyrard et al. ............... 277/235 B X
4,468,044 8/1984 Ulmer et al. .................... 277/166 X

FOREIGN PATENT DOCUMENTS 2347321 3/1975 Fed. Rep. of Germany ... 277/235 B

*Primary Examiner*—Robert S. Ward
*Attorney, Agent, or Firm*—Frank J. Jordan; C. Bruce Hamburg; Manabu Kanesaka

[57] ABSTRACT

A gasket for an internal combustion engine comprises a main seal member formed of a plurality of steel plates stacked together, each steel plate having a plurality of openings corresponding to through holes of the engine and at least one communicating portion situated between the adjacent two openings for providing communication between the two openings, a sealing device having a plurality of cylindrical portions to be situated in the openings of the main seal member and at least one intermediate portion to be situated in the communicating portion of the main seal member, and a covering device for substantially covering the sealing device and securely connecting the same to the main seal member. The openings of the main seal member are slightly larger than the through holes of the engine. The cylindrical portions and intermediate portion are integrally formed together.

14 Claims, 6 Drawing Sheets

FIG. 1 Prior Art
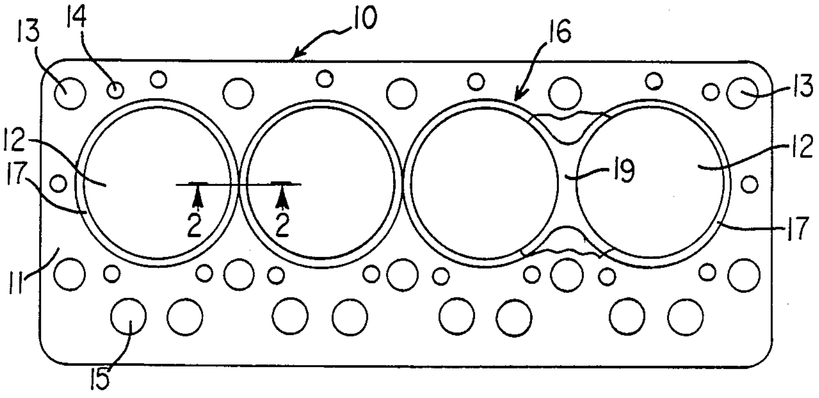
FIG. 2 Prior Art
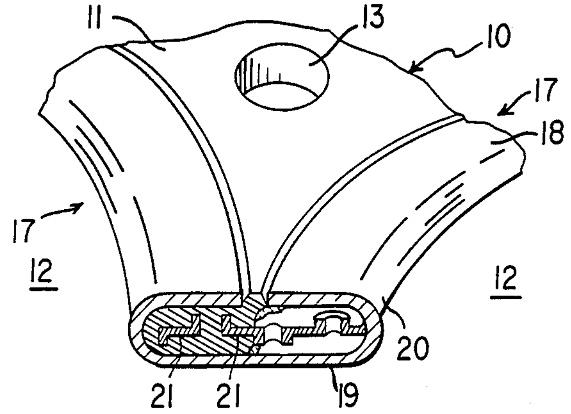
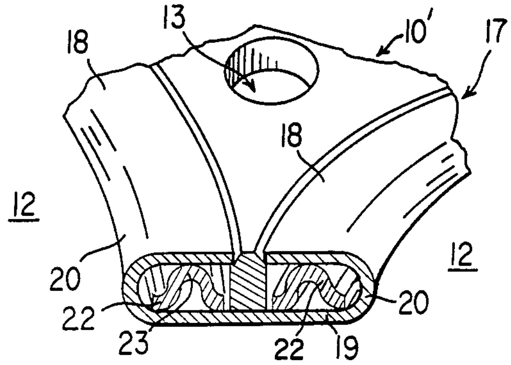
FIG. 3 Prior Art

GASKET FOR AN INTERNAL COMBUSTION ENGINE

CROSS-REFERENCE TO RELATED APPLICATION

The present invention is a continuation in part application of Ser. No. 936,866 filed on Dec. 2, 1986 and now U.S. Pat. No. 4,711,456.

BACKGROUND OF THE INVENTION AND RELATED ART STATEMENT

The present invention relates to a gasket for an internal combustion engine, more particularly a cylinder head gasket situated between a cylinder head and a cylinder block for tightly sealing therebetween. The cylinder head gasket of the invention is especially useful where cylinder bores of the engine, through which pistons reciprocate, are situated close to each other.

An automobile engine has been developed to become light in weight and small in size as well as to increase power. In association therewith, combustion pressure and heat load applied to an engine increase, so that is has become hard to properly seal between the cylinder head and the cylinder block by means of a conventional cylinder head gasket.

Especially, a large amount of heat load is concentrated in portions between the cylinder bores of the cylinder head gasket. Further, the distance between the cylinder bores has, recently, becomes small because of development of a small engine with light weight. Therefore, it is very difficult to properly seal a portion between the cylinder bores.

A conventional cylinder head gasket 10, as shown in FIG. 1, comprises a main seal member 11 having four cylinder bores 12 and a plurality of holes 13, 14 and 15 for bolts, cooling water and push rods, respectively, and a cover member 16 for covering a part of the main seal member 11 adjacent the cylinder bores 12. The main seal member 11 is formed of a gasket material, such as asbestos, mixture of asbestos and gum, mixture of synthetic fibers and gum, or graphite. The cover member 16 includes four ring members 17, each having upper, bottom and curved portions 18, 19 and 20, respectively (FIGS. 2 and 3). The bottom portions 19 of the ring members 17 are connected to the adjacent bottom portions so that the cover member 16 becomes a single structure (FIG. 1).

In the embodiment as shown in FIGS. 1 and 2, the main seal member 11 includes a core material 21 embedded therein. The cover member 16 is attached to the main seal member 11 so that each curved portion 20 is located inside each cylinder bore 12. In this position, each bottom portion 19 is located under the main seal member 11. The upper portions 18 are bent to be located above the main seal member 11.

In case the cylinder head gasket 10 formed as explained above is installed in a newly developed engine, where the distance between the cylinder bores is made smaller than that in the conventional engine, the gasket material of the main seal member 11 may finally become creep relaxation due to excess heat in use. Consequently, seal pressure on the gasket 10 becomes low to cause gas leakage. If the distance between the cylinder bores are too short, the cylinder head gasket may be broken due to insufficient strength of the gasket.

Another conventional cylinder head gasket 10′ is shown in FIG. 3, wherein the gasket 10′ further includes a plurality of seal rings 22, each seal ring 22 having a bead 23 therein. The seal rings 22 are placed in the respective cylinder bores 12 of the main seal member 11, and the cover member 16 is installed in the gasket 10′ as in the gasket 10, so that the seal rings 22 are held in the gasket 10′. The cylinder bore formed in the seal member 11 of the embodiment 10′ is slightly larger than that formed in the embodiment 10. Consequently, the seal rings 22 can be placed in the seal member 11.

In case the cylinder head gasket 10′ as explained above is installed in a newly developed engine as in the gasket 10, since the seal rings 22 are independently formed and held by the cover member 16, the gasket 10′ can not demonstrate enough strength. Therefore, gas leakage may occur. In an extreme situation, the cover member may be broke.

Accordingly, one object of the present invention is to provide a gasket for an internal combustion engine, wherein the cylinder bores can be properly sealed.

Another object of the present invention is to provide a gasket as explained above, wherein a space between the cylinder bores can be securely sealed.

A further object of the present invention is to provide a gasket as explained above, wherein the gasket can be easily and economically manufactured.

Further objects and advantages of the invention will be apparent from the following description of the invention.

SUMMARY OF THE INVENTION

A gasket in accordance with the present invention is designed to be situated in an internal combustion engine with a plurality of through holes. In particular, the gasket of the invention is suitable for a cylinder head gasket to be placed between a cylinder head and a cylinder block.

The gasket of the invention comprises a main seal member formed of a plurality of steel plates stacked together, each steel plate having a plurality of openings corresponding to the through holes of the engine and at least one communicating portion situated between the adjacent two openings for providing communication between the two openings, a sealing device having a plurality of cylindrical portions to be situated in the openings of the main seal member and at least one intermediate portion to be situated in the communicating portion of the main seal member, and means for substantially covering the sealing device and securely connecting the same to the main seal member. The openings of the main seal member are slightly larger than the through holes. Also, the cylindrical portions and intermediate portion of the sealing device are integrally formed together.

The sealing device may comprise a plurality of steel plates to constitute a steel laminate structure. Preferably, at least one steel plate includes beads surrounding the respective through holes of the engine.

The sealing device may comprise one metal plate having beads surrounding the respective through holes of the engine. Also, the sealing device may comprise a core and a metal plate substantially covering the core.

BRIEF DESCRIPTION OF THE DRAWINGS

FIG. 1 is a plan view of one embodiment of conventional cylinder head gaskets, wherein a portion of a main seal member is cut;

FIG. 2 is a perspective section view taken along lines 2—2 in FIG. 1;

FIG. 3 is a perspective section view similar to FIG. 2, wherein another embodiment of conventional cylinder head gaskets is shown;

DETAILED DESCRIPTION OF PREFERRED EMBODIMENTS

Figure 4:
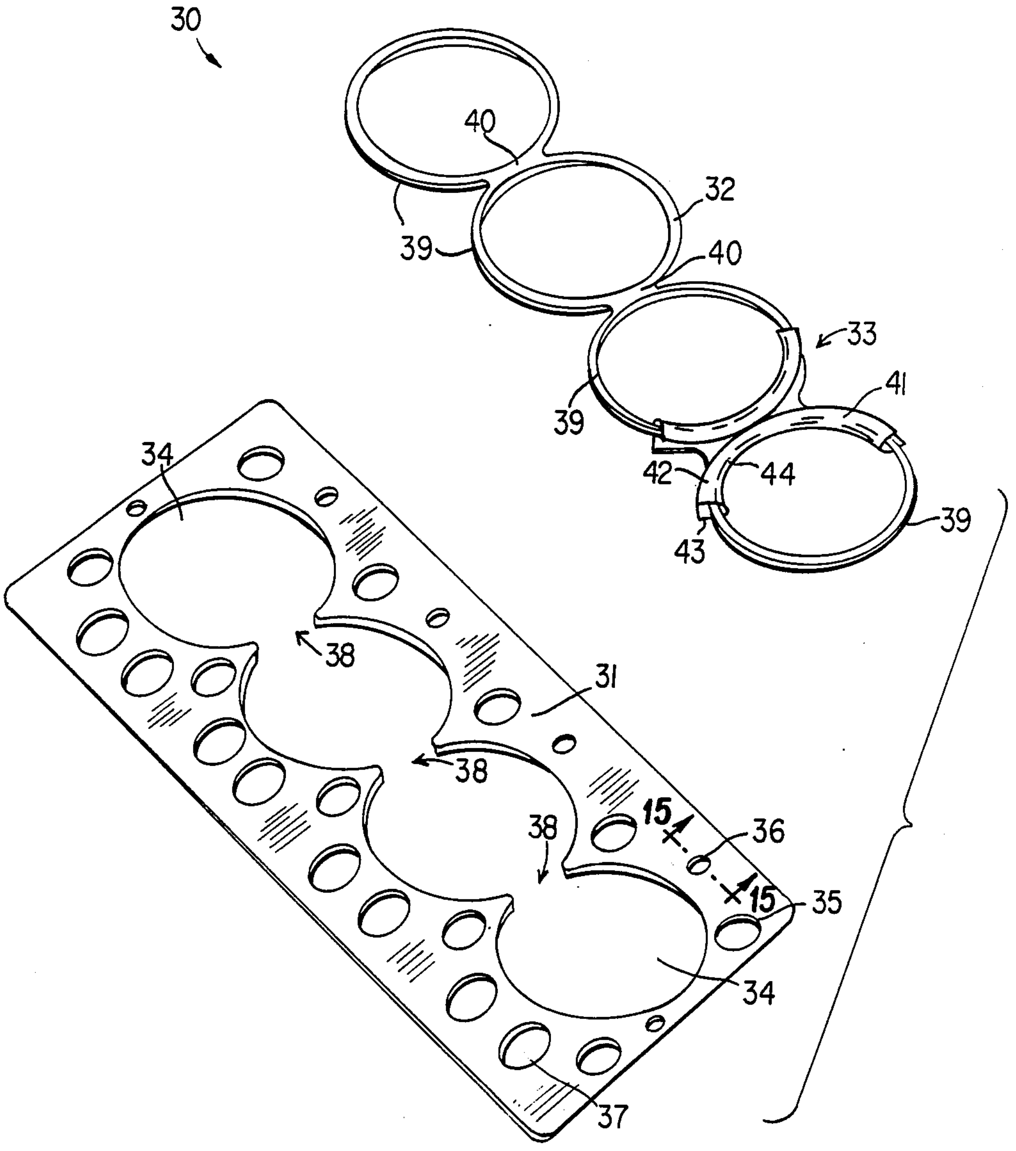
FIG. 4 is an explanatory view of a gasket in accordance with the present invention.

Referring to FIG. 4, a cylinder head gasket 30 in accordance with the present invention is schematically illustrated for explanation. The gasket 30 comprises a main seal member 31, a sealing device 32 to be situated in the main seal member 31, and a cover member 33 covering a part of the main seal member 31 and the sealing device 32 to thereby connect the sealing device 32 to the main seal member 31.

The main seal member 31 includes four cylinder bores 34, and a plurality of holes 35, 36 and 37 for bolts, cooling water and push rods, respectively, as in the main seal member 11. The main seal member 31, however, further includes three communicating portions 38 between the cylinder bores 34 so that the cylinder bores 34 communicate with each other.

Figure 15:
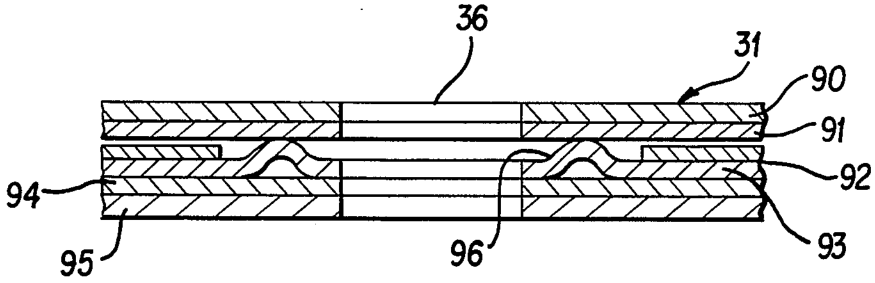
FIG. 15 is an enlarged section view taken along line 15—15 in FIG. 4.

As shown in FIG. 15, the main seal member 31 is formed of six steel plates 90, 91, 92, 93, 94, 95 stacked together, which have holes respectively to constitute the hole 36 for cooling water. The steel plate 93 is provided with a bead 96 around the hole 36 so that the hole 36 is tightly sealed when the gasket is tightened. The steel plate other than the steel plate 93 may be provided with a bead. Number of a steel plate for use as the main seal member 31 may be increased or decreased. The steel plates are connected together by spot welding.

The sealing device 32 comprises four rings 39 connected to each other at connecting portions 40. The sealing device 32 may be formed differently in structure, embodiments of which are explained hereinafter. Therefore, the sealing device 32 is shown in FIG. 4 for only illustration.

The cover member 33 used in the cylinder head gasket 30 of the present invention is the same as the cover member 16 used in the conventional gasket. Namely, the cover member 33 includes four ring members 41 (two ring members 41 are shown in FIG. 4), each ring member 41 being formed of upper, bottom and curved portions 42, 43 and 44 respectively. The bottom portions 43 are connected to the adjacent bottom portions so that the cover member 33 is a single structure.

When the main seal member 31, the sealing device 32 and the cover member 33 are assembled, the sealing device 32 is located inside the main seal member 31, wherein the rings 39 are located in the cylinder bores 34, and the connecting portions 40 are located in the communicating portions 38. Then, the cover member 33 is installed so that the bottom portions 43 are located under the rings 39 and a part of the main seal member 31, while the curved portions 44 are located inside the rings 39. Upper parts of the curved portions 44 are bent to be located above the rings 39 and a part of the main seal member 31. The upper parts of the curved portions 44 constitute the upper portions 42.

Figure 5:
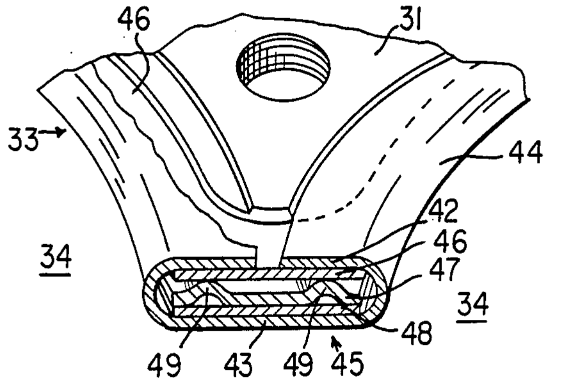
FIG. 5 is a perspective section view similar to FIG. 2, wherein a first embodiment of the gasket of the present invention is shown.

Referring to FIG. 5, a first embodiment 45 of the sealing device of the present invention is shown. The sealing device 45 comprises upper, intermediate and bottom plates 46, 47 and 48 respectively. The contour of the upper, intermediate and bottom plates 46, 47, 48 is exactly the same as that of the sealing device 32 as illustrated in FIG. 4. However, the intermediate plate 47 is provided with beads 49 around the cylinder bores 34, respectively, wherein top portions of the beads 49 abut against the upper plate 46. The plates 46, 47, 48 are made of a steel, such as stainless steel or soft steel. When assembled, the cover member 33 retains the sealing device 45 and connects the same to the main seal member 31.

Since the sealing device 45 is formed of a plurality of thin steel plates, in case thickness of the main seal member 31 is changed, thickness of the plates 46, 48 may simply be changed, so that the sealing device 45 can receive equal sealing pressure throughout the entire surface thereof. In case the thickness of the main seal member 31 is changed, it is unnecessary to change the entire sealing device 45. It is easy to make a sealing device with different thickness.

Figure 6:
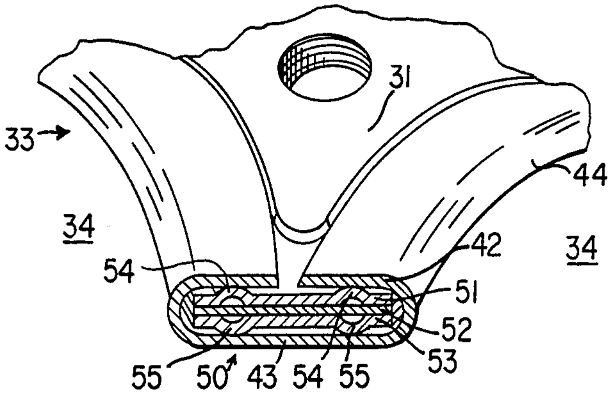
FIG. 6 is a perspective section view similar to FIG. 5, wherein a second embodiment of the gasket of the present invention is shown.

A second embodiment 50 of the sealing device of the invention is shown in FIG. 6. The sealing device 50 comprises upper, intermediate and bottom plates 51, 52 and 53 respectively. The contour of the upper, intermediate and bottom plates 51, 52, 53 is exactly the same as that of the sealing device 32. However, the upper and bottom plates 51, 53 are provided with beads 54, 55 around the cylinder bores 34, respectively. The beads 54 orients upwardly, while the beads 55 orients downwardly. The cover member 33 retains the sealing device 50 in the assembled form and connects the same to the main seal member 31.

In this embodiment, since the upper and bottom plates 51, 53 are provided with the beads 54, 55, the compression capacity is relatively larger. Therefore, the sealing device 50 is especially suitable for an engine equipped with a liner, where there is a small step between the liner and a cylinder block.

Figure 7:
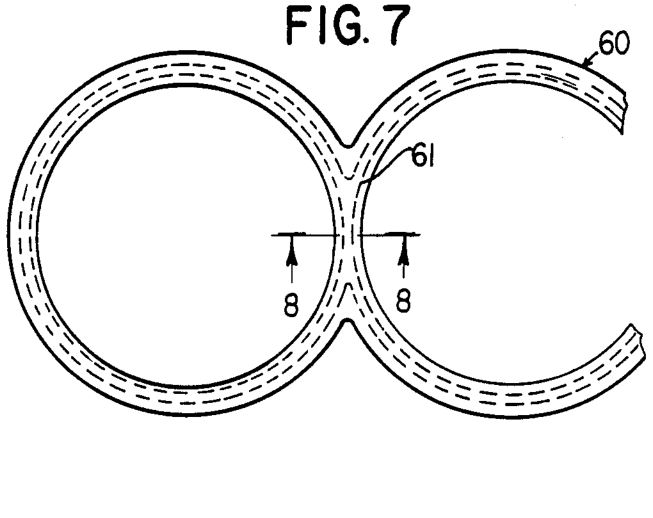
FIG. 7 is a partial plan view of a sealing device, wherein the sealing device is prepared in accordance with a third embodiment of the gasket of the present invention.
Figure 8:
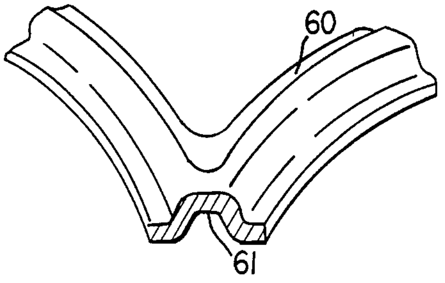
FIG. 8 is a perspective section view taken along lines 8—8 in FIG. 7.

FIGS. 7 and 8 show a third embodiment 60 of the sealing device of the present invention. The sealing device 60 is formed of one plate and includes beads 61 around the cylinder bores 34. In FIG. 7, the beads 61 are indicated by chain lines. The beads 61 are joinded at an intermediate portion situated between the cylinder bores 34 to thereby form one bead portion. Therefore, the sealing device 60 is especially suitable for an engine where a space between the cylinder bores is narrow.

Figure 9:
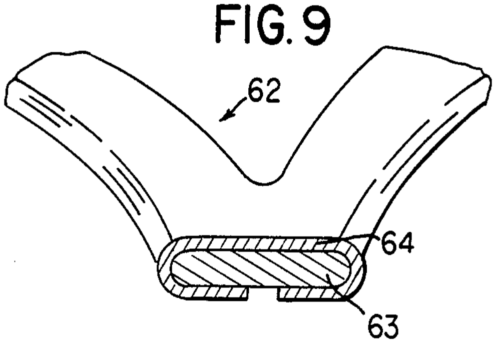
FIG. 9 is a perspective section view similar to FIG. 8, wherein a sealing device prepared in accordance with a fourth embodiment of the present invention is shown.

FIG. 9 shows a fourth embodiment 62 of the sealing device of the present invention. The sealing device 62 comprises a core 63 and a metal plate 64 covering the core 63. Namely, the core 63 includes rings and connecting portions as shown in the sealing device 32. The core 63 may be made of a gasket material, such as asbestos, mixture of asbestos and gum, mixture of synthetic fibers and gum, or graphite. The metal plate 64 substantially covers the upper and bottom portions of the core 63 and inner portions of the core 63 facing the cylinder bores 34.

Since the sealing device 62 can deform properly when the gasket is tightened, the sealing device 62 is especially useful in case the main seal member 31 is made of a hard material. In this situation, the gasket provides an equal sealing pressure.

Figure 10:
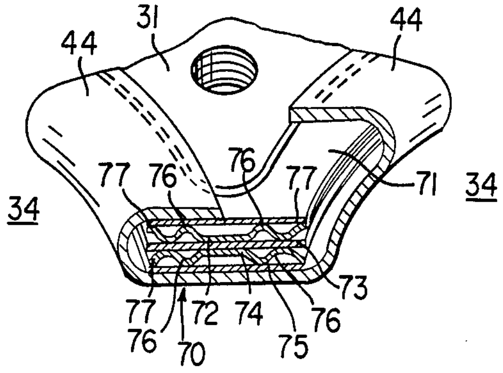
FIG. 10 is a perspective section view similar to FIG. 5, wherein a fifth embodiment of the gasket of the invention is shown.

FIG. 10 shows a fifth embodiment 70 of the sealing device of the present invention. The sealing device 70 comprises an upper plate 71, three intermediate plates 72, 73, 74, and a lower plate 75. The respective intermediate plates 72, 74 include main beads 76 surrounding the cylinder bores 34 and auxiliary beads 77 adjacent the main beads 76. The intermediate plate 73 is situated between the two intermediate plates 72, 74.

In this embodiment, since the intermediate plates 72, 74 is provided with the main beads 76 and the auxiliary beads 77, when the gasket is tightened in use, a specific sealing pressure area having a plurality of corrugated portions is formed around the cylinder bore. Accordingly, the sealing device 70 is especially suitable for an engine with a high combustion pressure.

Figure 11:
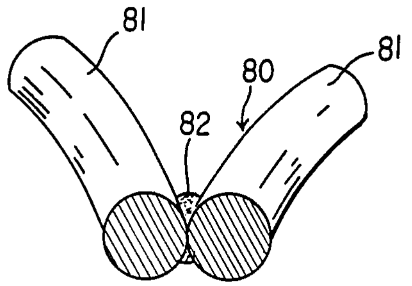
FIG. 11 is a perspective section view similar to FIG. 9, wherein a sealing device prepared in accordance with a sixth embodiment of the present invention is shown.

FIG. 11 shows a sixth embodiment 80 of the sealing device of the present invention. The sealing device 80 comprises a plurality of wire rings 81, the wire ring 81 being integrally connected to the adjacent wire ring 81 by means of welding 82. The wire ring 81 may be a soft wire, such as a steel wire or a stainless steel wire having a Micre Vickers Hardness of 80–180 Hmv. Since the wire rings 81 are integrally connected together, the wire rings 81 cooperate and support with each other. Namely, the wire rings are strengthened by themselves when integrally connected together. Therefore, the gasket with the sealing device 80 can be used for an engine with a high combustion pressure.

Figure 12:
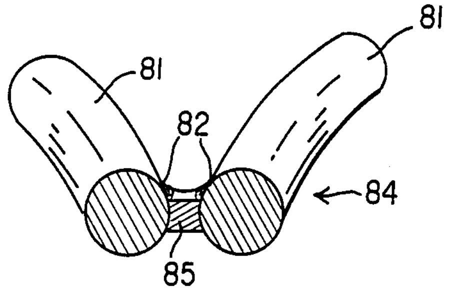
FIG. 12 is a perspective section view similar to FIG. 11, wherein a sealing device prepared in accordance with a seventh embodiment of the present invention is shown.

FIG. 12 shows a seventh embodiment 84 of the sealing device of the present invention, which is similar to the sealing device 80. The sealing device 84 comprises a plurality of wire rings 81 as in the sealing device 80, and at least one metal chip 85 between the wire rings 81. Namely, the wire rings 81 are integrally connected together by means of the metal chip 85 and welding 82. The sealing device 84 is formed and used in case a distance between the cylinder bores 34 is long so that the wire rings 81 can not directly be connected together.

Figure 13:
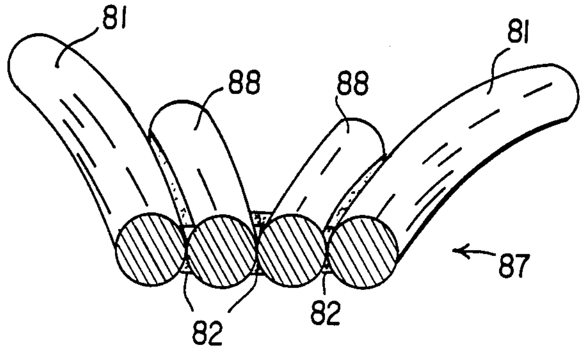
FIG. 13 is a perspective section view similar to FIG. 12, wherein a sealing device prepared in accordance with an eighth embodiment of the present invention is shown.
Figure 14:
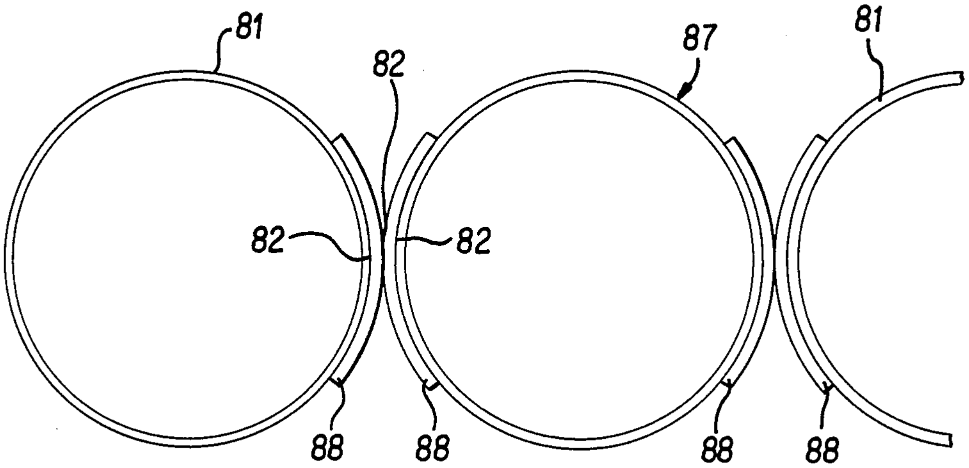
FIG. 14 is a partial plan view of a sealing device shown in FIG. 13.

FIGS. 13 and 14 show an eighth embodiment 87 of the sealing device of the present invention. The sealing device 87 comprises a plurality of wire rings 81 and arcuate wires 88 situated between the wire rings 81. The wire rings 81 and arcuate wires 88 are integrally connected together by means of welding 82. The wire 88 may be the same as or different from the wire ring 81. Also, the diameter of the wire is selected based on a condition of an engine. In this embodiment, sealing pressure is formed adjacent to the wire 88 as well as the wire rings 81, so that seal can be securely performed.

As explained above, the gasket of the present invention is provided with the sealing device including the cylindrical portions and the intermediate portions situated between the cylindrical portions, the cylindrical and intermediate portions being integrally connected together. Therefore, the gasket of the invention is strong even in a portion between the cylinder bores to thereby prevent leakage of gas from the cylinder bores. Especially, the gasket of the invention is useful for an engine where distance between the cylinder bores is narrow.

While the invention has been explained with reference to the specific embodiments of the invention, the explanation is illustration and the invention is limited only by the appended claims.

What is claimed is:

1. A gasket for an internal combustion engine with a plurality of through holes therein, comprising:

a main seal member formed of a plurality of steel plates stacked together, each steel plate having a plurality of openings corresponding to the through holes of the engine, said openings being slightly larger than the through holes, and at least one communicating portion situated between the adjacent two openings for providing communication between the two openings, a sealing device having a plurality of cylindrical portions to be situated in the openings of the main seal member, and at least one intermediate portion to be situated in the communicating portion of the main seal member, said cylindrical portions and intermediate portion being connected together, and means for substantially covering the sealing device and securely connecting the same to the main seal member.

2. A gasket according to claim 1, in which said covering means includes a plurality of ring members, each ring member having an upper portion, a bottom portion and a curved portion between the upper and bottom portions, said curved portion being located inside the cylindrical portion of the sealing device when assembled, said bottom portion being connected to the adjacent bottom portion to form single covering means.

3. A gasket according to claim 2, in which each upper portion of the ring member is situated over an upper surface of the sealing device and a part of the main seal member so that the sealing device does not disengage from the main seal device.

4. A gasket according to claim 1, in which said sealing device comprises a plurality of steel plates to constitute a steel laminate structure.

5. A gasket according to claim 4, in which at least one steel plate of the sealing device includes beads surrounding the respective through holes of the engine.

6. A gasket according to claim 5, in which two steel plates of the sealing device includes beads surrounding the respective through holes of the engine, top of the beads facing outwardly with each other.

7. A gasket according to claim 6, in which each steel plate having the bead further includes additional bead adjacent the bead so that strong sealing pressure is formed when tightened.

8. A gasket according to claim 1, in which said sealing device comprises one metal plate having beads surrounding the respective through holes of the engine.

9. A gasket according to claim 1, in which said sealing device comprises a core and a metal plate substantially covering the core.

10. A gasket according to claim 9, in which said core of the sealing device is formed of a non-metallic material.

11. A gasket according to claim 1, in which said sealing device comprises a plurality of wire rings laterally disposed and integrally connected to each other, each wire ring being circular to be disposed around the through holes of the engine.

12. A gasket according to claim 11, in which said sealing device further includes at least one metal chip situated between the two wire rings.

13. A gasket according to claim 11, in which said sealing device further includes at least two arcuate wire members situated between the two wire rings and integrally connected together so that additional sealing pressure is formed by the wire members.

14. A gasket according to claim 1, further comprising a plurality of fluid holes in the main seal member, at least one of the steel plates of the main seal member having a bead for surrounding the fluid hole to seal the same.

* * * * *